United States Patent [19]

Risser et al.

[11] Patent Number: 4,748,722

[45] Date of Patent: Jun. 7, 1988

[54] GIZZARD HARVESTER

[75] Inventors: Dale M. Risser, Salisbury, Md.; Michael E. Lease, Delmar, Del.

[73] Assignee: Perdue Incorporated, Salisbury, Md.

[21] Appl. No.: 8,596

[22] Filed: Jan. 23, 1987

Related U.S. Application Data

[63] Continuation-in-part of Ser. No. 839,950, Mar. 17, 1986, Pat. No. 4,691,410.

[51] Int. Cl.⁴ .............................................. A22C 21/00
[52] U.S. Cl. .............................................. 17/50; 17/11
[58] Field of Search ........................ 17/11, 43, 21, 50

[56] References Cited

U.S. PATENT DOCUMENTS 3,175,244  6/1965  Sharp et al. .............................. 17/11
4,590,643  5/1986  Hill ........................................... 17/11

Primary Examiner—Willie G. Abercrombie
Attorney, Agent, or Firm—Charles W. Fallow; Martin P. Hoffman; Mitchell B. Wasson

[57] ABSTRACT

A gizzard harvester is disclosed having a pair of opposed conveyors for receiving a gizzard and holding the same against rotation as the gizzard is advanced onto a rotating cone spindle which both washes foreign matter from the gizzard and removes its lining by rotating the lining with respect to the gizzard. Washing ports are provided at the tip of the cone, which ports also assist removal of the liner from the spindle.

20 Claims, 4 Drawing Sheets

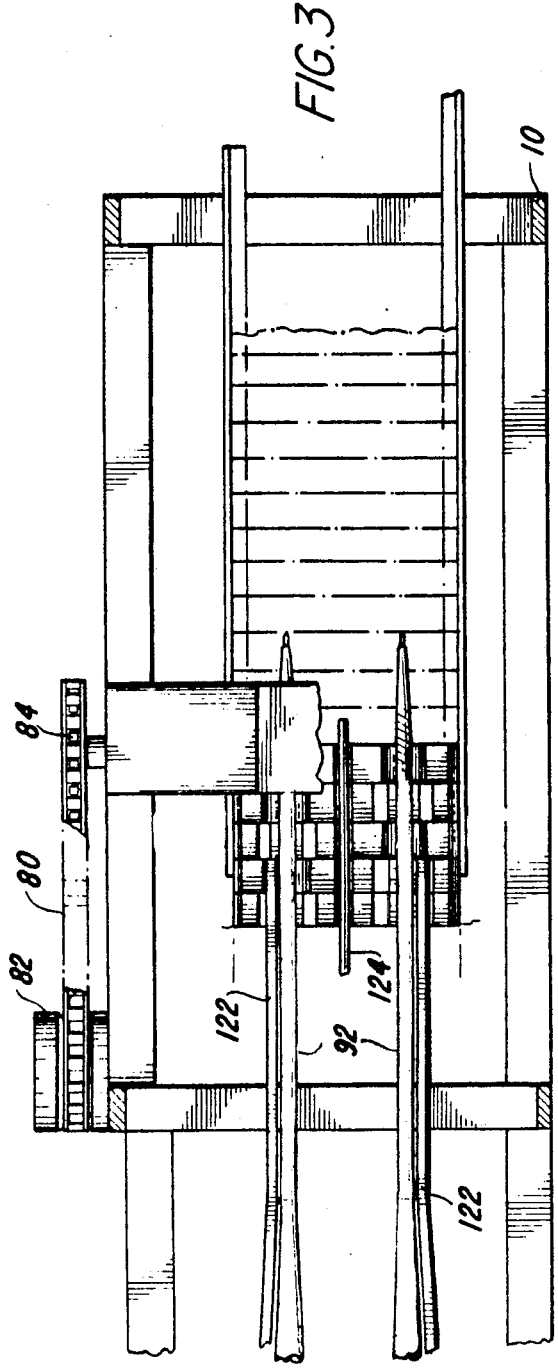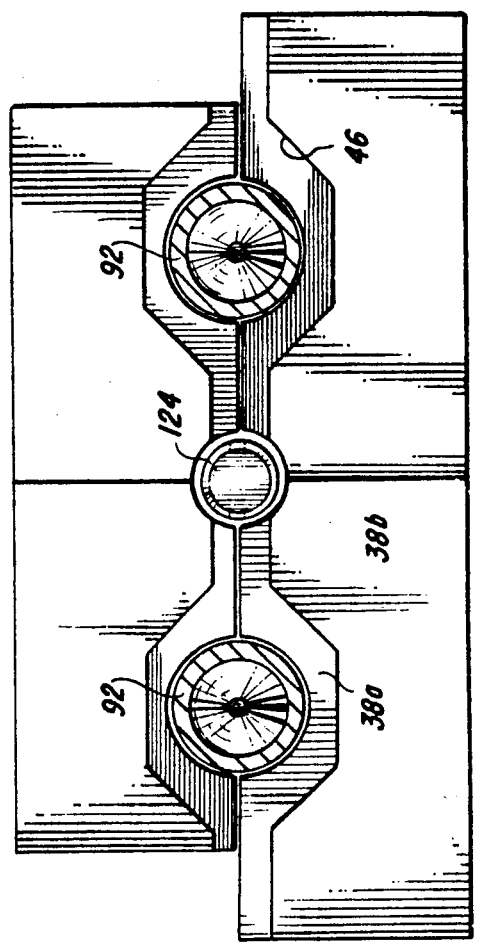

GIZZARD HARVESTER

This application is a continuation-in-part of copending application Ser. No. 839,950, filed Mar. 17, 1986, now U.S. Pat. No. 4,691,410 issued Sept. 8, 1987.

This invention relates generally to the art of butchering, and particularly to the art of gizzard processing.

BACKGROUND OF THE INVENTION

There are, both disclosed within the patent art, and available in commerce today, numerous devices for processing poultry gizzards. This aspect of poultry processing, which formerly was a tedious hand procedure, has become increasingly mechanized.

The volume of birds handled by a modern plant, typically hundreds of thousands per day, has magnified the need for efficient machinery. Not only is speed important, it is also necessary to avoid mutilating the gizzards as they are cleaned. Unfortunately, present-day gizzard processors do damage a substantial proportion, often over half, of the gizzards passed through them to the point of commerical unacceptability. In fact, it is sometimes necessary for a producer to purchase gizzards to make up giblet packs for whole birds. A reduced rejection rate would thus be highly desirable.

To process or "harvest" a gizzard, one must by some means: (a) separate the gizzard from the stomach and entrails attached to it, (b) remove stones, sand and other foreign material from the interior of the gizzard, and (c) remove the tough, inedible interior lining. Adequate automated machines exist for performing step (a). These may comprise a pair of counter-rotating parallel rolls separated by a space substantially smaller in width than a gizzard, with helical grooves to advance the gizzards to a portion having teeth that engage the entrails and tear them from the gizzards. Steps (b) and (c) are usually preceded by slitting the gizzard lengthwise in a radial plane, whereupon the gizzard can be spread open for cleaning. The lining, thus exposed, is removed by peeling it from the edible remainder of the organ. Most of the automatic prior art gizzard harvesters have a knife or the like to slit the gizzards as a processing step. This may precede or follow grit removal; in the former case, knife wear is a problem.

An unusual approach was disclosed in U.S. Pat. No. 3,175,244. In that patent, a gizzard is first cleaned by inserting a flushing jet into the gizzard cavity. The gizzard is then telescoped over the free end of a rotating arbor, which in one embodiment has a conical portion with helical, square grooves thereon, that tears the lining from the gizzard without the usual cutting step. This device did not, however, become commercially successful. So, despite the many approaches tried thus far, however, now device has emerged that is both uncomplicated and capable of harvesting gizzards at high speed with a low rejection rate.

It is therefore an object of this invention to process gizzards in such a way as to minimize their rejection rate. In other words, the object is to remove fully the liner and all grit from each gizzard, without tearing it is half or otherwise making it unmarketable as a giblet.

Indeed, another object is to remove the liner and grit from a gizzard without the customary slitting, thus avoiding knife wear problems.

A further object is to perform the steps of cleaning and lining removal at a single station, at essentially the same time.

Another object is to provide the industry with a machine capable of mass-production processing rates while attaining the above objects.

SUMMARY OF THE INVENTION

The invention satisfies these and other objects by providing a device for removing foreign material and the lining from a gizzard. The device includes means for holding the gizzard against rotation, a tapered spindle head for insertion into the gizzard liner, means for producing relative linear movement between the spindle head and the gizzard, and means for producing relative rotation between the spindle head and the gizzard, said spindle head being adapted to engage the gizzard lining as relative rotation occurs, thereby to separate the lining from the gizzard.

The presently preferred apparatus includes a pair of endless chain conveyors disposed one above the other in a vertical plane with the adjacent horizontal straight runs of the conveyors moving synchronously in the same direction close together astride one or more rotating spindles. The conveyor flights are configured to restrain the gizzards while advancing them over the spindle, the latter serving to remove the gizzard liners and wash out the foreign material. This apparatus is capable of high production rates, with a much lower rejection rate than has heretofore been obtainable.

Other features and advantages of the invention will be apparent from the following description, read with reference to the drawings.

BRIEF DESCRIPTION OF THE DRAWINGS

FIG. 3 is an enlarged sectional view looking down along the line 3—3 in FIG. 1;

FIG. 4 shows, at enlarged scale, a sectional view of the conveyor taken along the line 4—4 in FIG. 1.

DESCRIPTION OF THE PREFERRED EMBODIMENT

Figure 1:
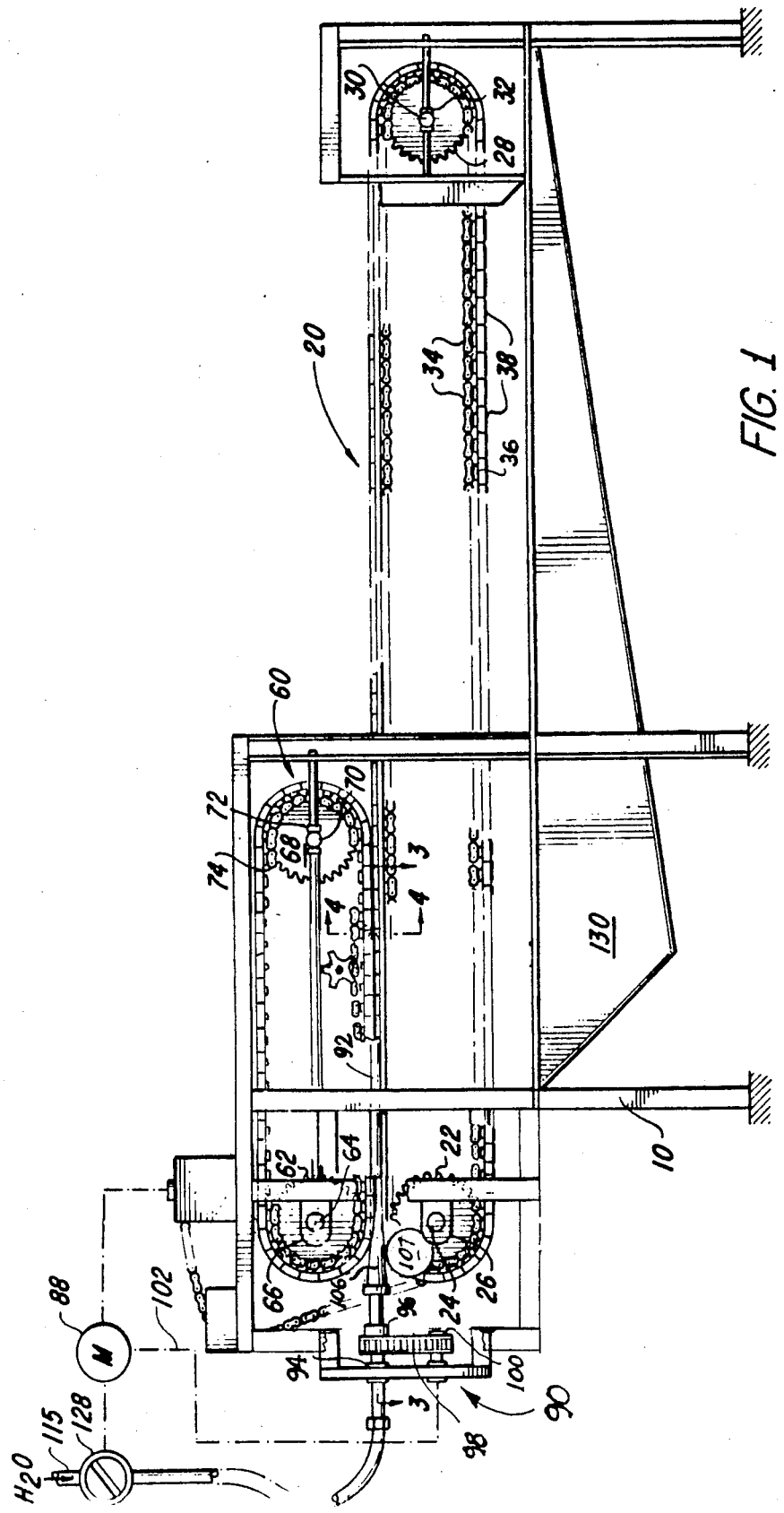
FIG. 1 is a front elevation of a preferred embodiment of the invention.
Figure 2:
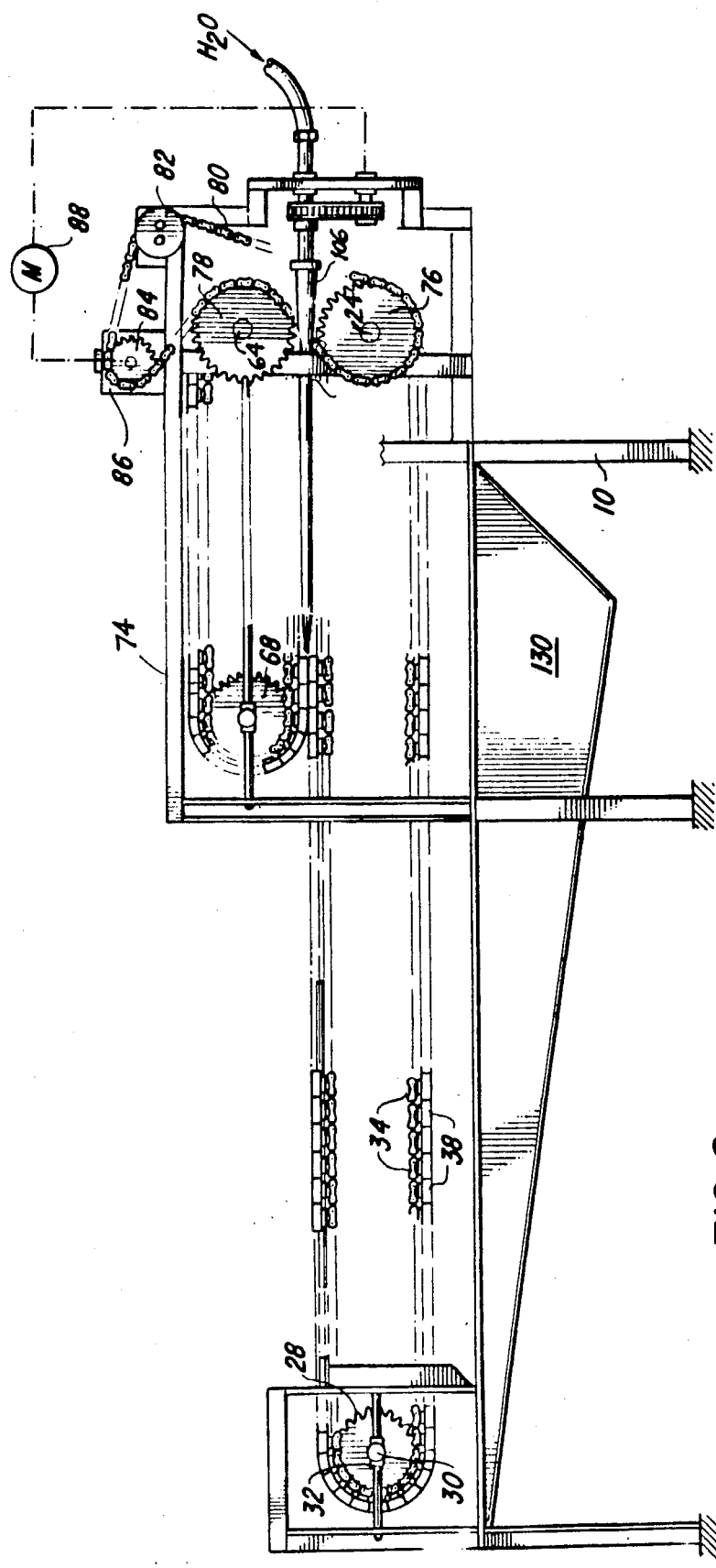
FIG. 2 is a rear elevation thereof.

With reference to FIGS. 1-3, a gizzard harvester embodying the invention comprises a stationary frame 10 which supports a lower conveyor assembly 20, an upper conveyor assembly 60, and a spindle assembly 90, these comprising a major subassemblies of the apparatus.

Figure 5:
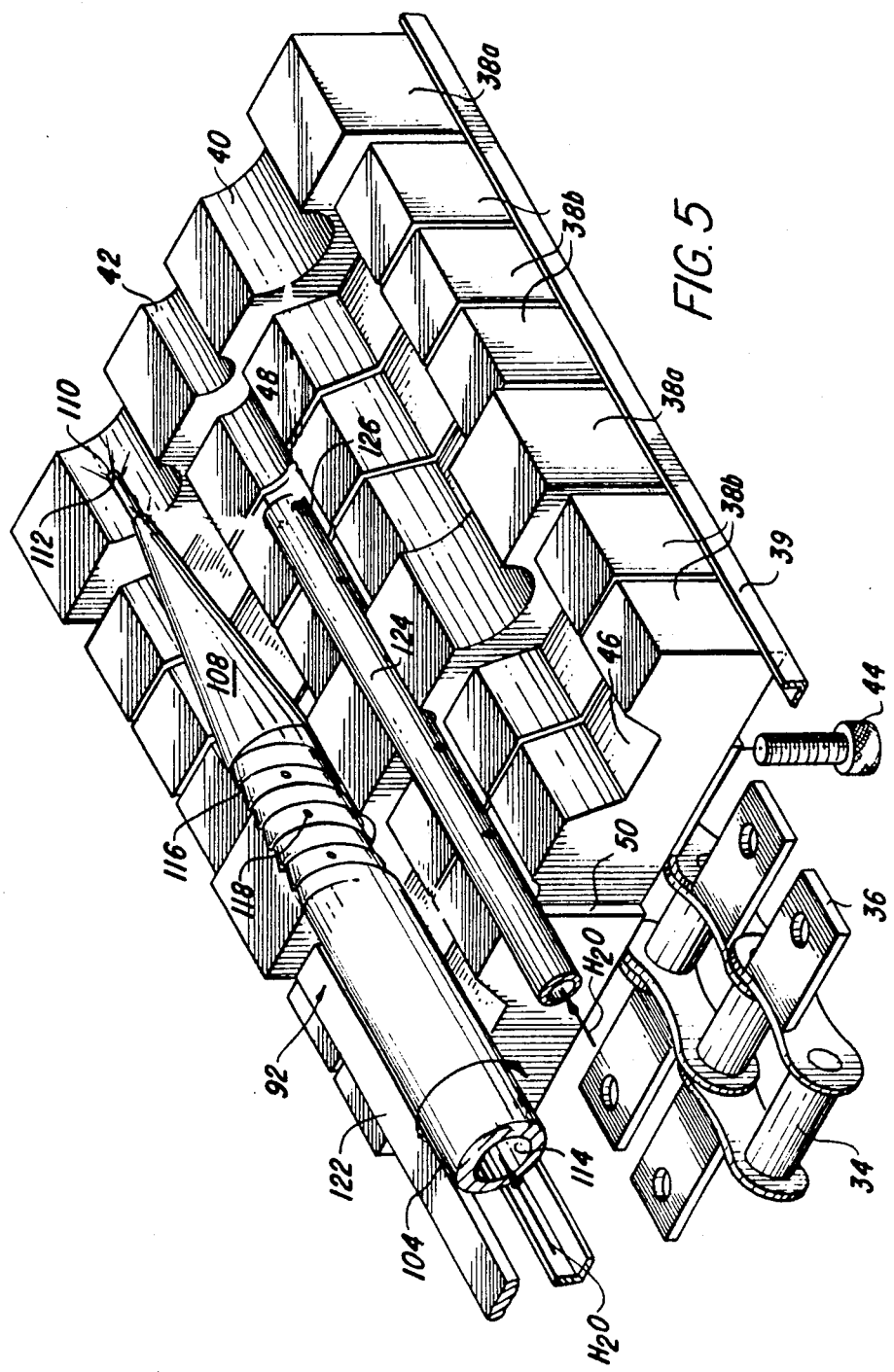
FIG. 5 is an isometric view of a portion of the surface of the lower conveyor and one spindle of the invention.

The lower conveyor assembly 20 includes a metal drive sprocket 22 supported for rotation with respect to the frame 10 by means of a shaft 24 journalled in bearings 26 that are affixed to the frame, and a plastic idler sprocket 28 of like dimension supported by a shaft 30 and bearings 32 at the opposite end of the base. An endless chain 34, installed upon the sprockets 22 and 28, is maintained in tension thereon by a conventional chain tensioner, not shown in detail. The preferred chain is a no. 80 (one inch between pins) chain available commercially under part no. RS 80 "with K-1 attachment" from Tsubaki. The K-1 attachment constitutes a pair of ears 36 welded to each link of the chain. The chain is installed with the ears facing outboard of the chain loop, as shown in FIG. 5.

Each pair of ears supports a conveyor flight 38 made of biologically inert plastic such as nylon or PTFE. The outer surfaces of the flights are specially configured to support and advance gizzards toward the spindle assembly 90, as described below. The conveyor comprises two distince types of flights, designated 38a and 38b in FIGS. 3 and 5, which ride between guide tracks 39. We call flights 38a "pushers" and flights 38b "carriers". Each pusher flight 38a is symmetrical about a vertical center plane, and there is one such flight every four flights, as shown. The pusher flights 38a have upper surfaces characterized by a pair of semi-circular cutouts 40, just slightly larger in diameter than that of the spindles described below, with a detent 42 midway therebetween. The flights are connected to the chain ears by means of bolts 44.

Between each pair of pusher flights 38a, there is a set of preferably three carrier flights 38b; alternating sets of these are reversed right-to-left, as illustrated. The carrier flights 38b have trapezoidal cutouts 46, much larger than the semi-circular cutouts 40 of flights 38a, on their upper surfaces, with a small detent 48 therebetween. Bolts 44 hold the flights fast to the conveyor links. Each carrier flight 38b is rendered laterally asymmetric by reliefs 50 milled on both its sides along half its width. The purpose of the reliefs is to allow for drainage, as described below.

The upper conveyor, except for its length, is substantially identical in detail to the lower conveyor. The assembly 60 includes a drive sprocket 62 (supported by a shaft 64 and bearings 66) and an idler sprocket 68 (supported by a shaft 70 and bearings 72). The sprocket 62 and 68 carry a chain 74 that is, except for its length, identical to the chain 34 and is provided with pusher and carrier flights arranged in a fashion identical to that previously described.

Looking at the invention from the rear, FIG. 2, one can see a positive drive mechanism for moving the conveyors synchronously together. The mechanism comprises a first sprocket 76 attached to drive shaft 24 and a second sprocket 78 attached to drive shaft 64. These two sprockets 76 and 78 are engaged by a common endless chain 80 which passes over an idler 82 and a drive sprocket 84. The drive sprocket is rotated intermittently by a mechanism 86 powered by a continuously operating motor 88. The mechanism, which may comprise eccentric sprockets or a Geneva drive or other known transmission, is designed to convert continuous rotary input to intermittent or varying speed rotary output.

The upper and lower conveyor chains 34,74 are installed with the flights 38a or 38b in registration width and facing one another. Such registration is maintained by the drive chain 80 throughout operation of the device.

FIG. 4 shows how the facing cutouts 46 of opposed carrier flights 38b form pockets which are bounded on either end by the smaller cutouts 40 in flights 38a.

Now referring to FIGS. 1 and 5, the spindle assembly 90 of the preferred embodiment comprises two identical spindles 92 supported for rotation about their longitudinal axes via respective bearings 94 in the base 10. Small sprockets 96 and a chain 98 thereon synchronize rotation of the sprockets, and connect them to a drive sprocket 100 which is rotated continuously by the motor 88 through mechanical means shown diagrammatically by dashed line 102. The motion of all mechanical moving parts of the apparatus is thus mechanically interrelated.

Each spindle 92 comprises a three-quarter inch diameter shaft 104 of substantial length (about 30 inches) having, at the proximal end thereof (near its support bearing 94), an outwardly flared frusto-conical gizzard splitter 106 just above a rotary cutter disc 107.

The opposite, distal end of the shaft terminates at a conical head 108 having an apex angle of about 15°. We have found that even a smooth surfaced head will sufficiently engage a gizzard lining as the gizzard is advanced onto the spindle, and thus a smooth surface is presently preferred. However, the head may alternatively have spiral grooves thereon, as shown in our copending application Ser. No. 839,950, supra, or in U.S. Pat. No. 3,175,244, supra. The head terminates at a small rounded tip 110 having one or more lateral washing ports 112. These ports are in fluid communication, via an axial bore 114 extending the length of the spindle, with a source 115 of water under high pressure. Conventional seals, not shown, prevent escape of water as the spindle rotates.

Along the constant diameter portion of the shaft adjacent the conical head, there are helical grooves 116 cut in the surface. The hand of the grooves is opposite to the direction of spindle rotation so as to encourage reverse linear motion of gizzard liners after they are separated from their gizzards. That is, for spindles that rotate in the clockwise direction (when viewed from the left end of FIG. 1) left-hand grooves are provided. Plural water ports 118, extending through the shaft at the grooved area assist in liner removal.

A bar 122 is attached to the base 10, closely parallel to the threaded portion of each shaft, for engaging the outside of gizzards thereon.

To assist in removing liners from the spindle head, a spraying wand 124 is affixed to the frame 10 parallel to and midway between the spindles 92. This wand is also connected to the source of high pressure water and has a bore that allows the water to flow to nozzles 126 drilled in the wand so as to direct a stream of water against either spindle.

Water may be provided to the ports 112 and 118 and to nozzles 126, continuously. However, to converse water, we prefer to spray water only when needed (that is, during the dwell periods). This can be accomplished by various well-known rotary valves or the like, designated 128 in FIG. 1. This valve is preferably mechanically driven by the motor 88.

In operation, the motor 88 is activated, causing continuous rotation of the spindles and intermittent synchronized movement of the upper and lower conveyors. The mechanical drive produces four inches of chain motion (four chain links) per cycle and then a substantially motionless dwell period. As the conveyors thus advance, gizzards are manually or automatically placed on the upper exposed surface of the lower conveyor's flights 38b in the pockets defined by the trapezoidal cutouts 46 between the flights 38a, and this is done alternating from one side of the conveyor to the other. It is important that the gizzards be properly placed, that is, with the opening to the gizzard oriented toward its respective spindle. After a gizzard has been placed, it is carried toward the spindle assembly, and ultimately it is engaged from above by the flights of the upper conveyor, which compress it against the lower flights sufficiently to prevent gizzard rotation when the spindle is engaged. The chain drive is indexed in such a way that one swell point is at a spot where the washing tip is just inside the gizzard. At this point, the valve 128 is open, releasing high pressure water to the ports 112, which spray water outwardly to remove any and all grit from the interior of the gizzard. The rotary motion of the spindle naturally spins the jets within the gizzard, assisting the washing function.

The next cycle of conveyor movement forces the gizzard over the rapidly spinning spindle head, engages and wraps upon the head the liner material of the gizzard, while the gizzard itself is restrained from rotating by the opposed flights. This tears the liner from the gizzard muscle, whereafter the latter is carried on over and past the spindle head by the flights. The remaining liner is removed from the head by means of a water blast from shaft ports 118 and from wand nozzle 124, while the muscle portion of the gizzard is carried on by, and eventually is released from, the pockets formed between the conveyor flights. Beyond this point, the gizzard muscle, now prevented from rotating by bar 122, is advanced by the conveyors over the remaining length of the spindle 92 to the cutter wheel. Once severed, each gizzard falls off its spindle into a fat remover and thence onto a continuous outfeed conveyor, not shown. The gizzard liners meanwhile fall, along with the removed grit and other waste, into a waste receptacle 130 substantially below the area of the spindle heads.

Owing to the alternating placement of the non-symmetrical flights 38b, the two spindles engage a series of gizzards in alternating fashion. The milled reliefs 50 help prevent debris from accumulating on the conveyor surface, by providing substantial slots for the through passage of flushing water.

This apparatus has the advantage of rapid, continuous function without the need for special electric sensors, drives and the like. The rate of production in practice is limited only by one's ability to place gizzards upon the infeed conveyor.

Inasmuch as the invention is subject to various alterations, modifications and changes in detail, it is intended that the foregoing description shall be regarded as only illustrative of the invention whose full scope is to be measured by the following claims.

We claim:

1. A device for removing foreign material and lining from a gizzard, comprising
   means for holding the gizzard against rotation,
   a tapered spindle head having a tip facing the holding means,
   means for producing relative linear movement between the spindle head and the gizzard so that said tip enters the gizzard,
   means for producing relative rotation between the spindle head and the gizzard,
   said spindle head being adapted to engage and rotate the gizzard lining as said relative rotation occurs, thereby to separate the lining from the gizzard,
   said gizzard advancing means comprising a lower endless conveyor and an upper endless conveyor, the paths of both said conveyors having portions parallel to and facing one another, and
   said holding means comprising two series of flights attached to respective ones of said conveyors,
   said flights being configured to form, between the conveyors over the portions facing one another, a series of pockets for holding a series of gizzards and preventing rotation thereof while advancing the gizzards onto said spindle head.

2. The invention of claim 1, wherein the means for producing relative linear movement comprises means for advancing the gizzard toward the spindle head, the latter being linearly immobile.

3. The invention of claim 1, wherein the means for producing relative rotation comprises means for rotating the spindle head.

4. The invention of claim 1, wherein each of said conveyors comprises an endless chain loop supported by a pair of sprockets, said flights being attached to said chain loops, said loops having linear runs between said sprockets, one such run of each conveyor facing and being parallel to that of the other conveyor.

5. The invention of claim 3, wherein said series of flights comprises an alternating arrangement of carrier flights and pusher flights, said carrier flights having recesses for forming said pockets, and said pusher flights serving to close said pockets on either end thereof.

6. The invention of claim 1, further comprising a source of water under pressure, and wherein said spindle head is affixed at one end of a hollow shaft connected to said source, and further comprises a washing tip at the apex of said head, said tip having at least one port therein for ejecting water within said shaft into said gizzard to flush debris therefrom.

7. The invention of claim 6, wherein said spindle head has a smooth surface for engaging a gizzard liner.

8. The invention of claim 6, wherein said spindle head has at least one helical groove thereon for engaging a gizzard liner.

9. The invention of claim 6, further comprising means for ejecting a liner from said spindle head following its separation from its gizzard.

10. The invention of claim 9, wherein said liner ejecting means comprises at least one helical groove of hand opposite that of spindle rotation, when viewed along said spindle toward said tip, on said shaft adjacent said head.

11. The invention of claim 10, wherein said liner ejecting means further comprises at least one water blast port extending laterally through said shaft within the grooved portion of the shaft.

12. The invention of claim 9, wherein said liner ejecting means comprises a spraying wand connected to said water source, said wand having a nozzle for directing water at said spindle head.

13. The invention of claim 6, further comprising a valve downstream of said water source, and means mechanically connecting said valve to said conveyors, so as to control water flow as a function of conveyor displacement.

14. The invention of claim 13, further comprising means for producting cyclic intermittent motion of said conveyors, and means for connecting said valve to such means in such a way that said valve is open only when said conveyors are motionless.

15. The invention of claim 6, further comprising means for producing cyclic intermittent motion of said conveyors.

16. The invention of claim 15, wherein said conveyors are indexed so that a given gizzard has a motionless dwell point upon said washing tip.

17. The invention of claim 11, further comprising means for producing cyclic intermittent motion of said conveyors.

18. The invention of claim 17, wherein said conveyors are indexed so that a given gizzard has a motionless dwell point upon said washing tip, and another motionless dwell point over said water blast port.

19. The invention of claim 6, further comprising a cone mounted at an end of said shaft opposite said head, said cone having an ultimate diameter sufficient to rupture gizzards passing thereover.

20. A method of removing the liner and debris from gizzards, comprising steps of:
 loading a series of gizzards onto a conveyor,
 moving said gizzards along said conveyor onto a rotating spindle having a tapered head with irrigating means to remove the debris,
 forcing said gizzards over said head to remove the liners therefrom, and
 ejecting said liners from said head.

* * * * *